No. 808,974. PATENTED JAN. 2, 1906.
H. DAVID.
PROTECTOR FOR PNEUMATIC TIRES.
APPLICATION FILED JAN. 20, 1904.
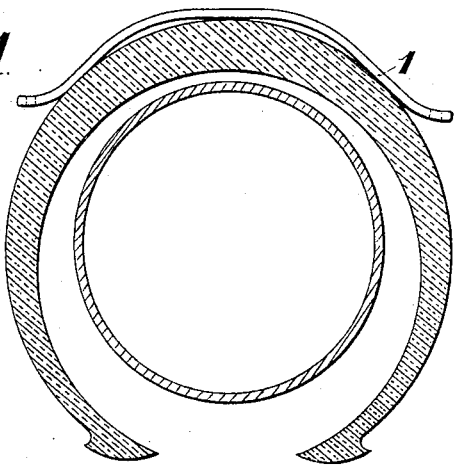
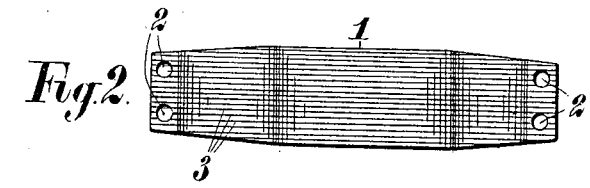
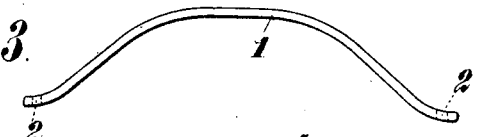
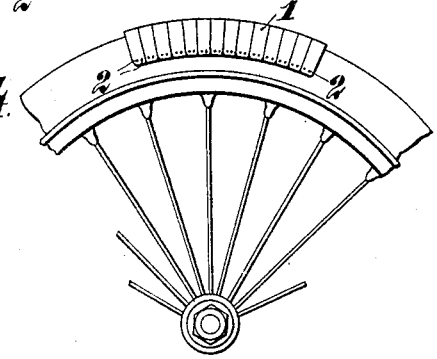
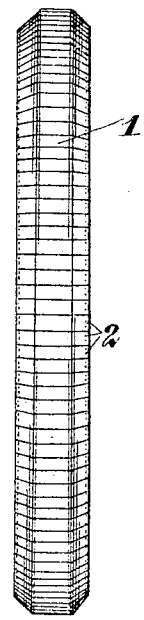
Witnesses
May Bird
Waldo M. Chapin
Inventor
Henri David
by W. A. Rosenbaum
atty

UNITED STATES PATENT OFFICE.

HENRI DAVID, OF PARIS, FRANCE.

PROTECTOR FOR PNEUMATIC TIRES.

No. 808,974.

Specification of Letters Patent.

Patented Jan. 2, 1906.

Application filed January 20, 1904. Serial No. 189,856.

*To all whom it may concern:*

Be it known that I, HENRI DAVID, engineer, a citizen of the French Republic, residing at Paris, in the Department of the Seine, France, have invented an Improved Antiskidding and Anti-Side-Slip Protector for Pneumatic Tires, of All Descriptions, of which the following is a specification.

This invention relates to an antiskidding and anti-side-slip removable protector which can be applied to any kind of pneumatic tires. Its adaptation over pneumatic tires is very easily performed and when in proper position it will not only act as an antiskidding and anti-side-slip external cover, but will also be found extremely serviceable as a protector against perforations by nails, glass, &c. This antiskidding removable protector will now be described in detail, with reference to the accompanying drawings, in which—

Figure 1 is a sectional view of an ordinary pneumatic tire over which this antiskidding removable protector has been placed. Fig. 2 is a flat view showing one of the thin strips of metal which form said antiskidding protector. Fig. 3 is a side view of the same. Fig. 4 is a side view of a fragment or portion of a wheel covered with the antiskidding removable protector. Fig. 5 is a front view of a wheel covered with the same.

As illustrated by the accompanying drawings, this said protector is formed with thin metallic strips, which are independent from each other, as shown by Fig. 1. In the formation of said strips any suitable metal may be used. These metallic strips are fixed over the external part of pneumatic tires by means of any convenient and adequate fastening device made or caused to pass through holes 2, which are placed to that effect at both ends of each metallic strip. These may also be kept back either by a metallic rod, a wire, chain-links, or else by any other proper device or disposition leading to the same result. An important feature of said metallic strips consists in internal flutings 3, (shown by Fig. 2,) which enable said strips to adhere perfectly to the external surface of the pneumatic tire, thus avoiding their slipping against the surface of the pneumatic tire.

Each of the metallic strips 1 is bent at two points to form a central tread portion and two diagonally-arranged sides, both the tread portion and the sides being straight or substantially straight. In this way there is a converging space formed within the wall of each strip, on the inner surface thereof, within which the tire fits when the protector is in place. The said tire is therefore pressed slightly out of its normal shape, and the internal pressure of the air within it serves to hold the walls of the tire in close contact with the inner surfaces of the sides of each strip 1, thereby preventing slipping of the strip on the tire. Furthermore, the comparatively sharp angle between the tread portion and the sides of the strips 1 tends to prevent the slipping of the wheel when traversing ice or smooth pavements.

Having now particularly described and ascertained the nature of my invention and in what manner the same is to be performed, I declare that what I claim as my invention, and what I desire to secure by Letters Patent, is—

An antislipping removable protector for pneumatic tires, comprising a series of independent narrow metallic strips secured upon and extending transversely of the tire, each of said strips being bent at two points to form a central tread portion and diagonally-arranged substantially straight sides having eyes at their extremities and fastening means passed through said eyes to hold the strips upon the tire.

In testimony whereof I have signed my name to this specification in the presence of two subscribing witnesses.

HENRI DAVID.

Witnesses:
 LUCIEN CRESPING,
 HERNANDO DE SOTO.